(12) United States Patent
Hsu

(10) Patent No.: US 10,590,685 B2
(45) Date of Patent: Mar. 17, 2020

(54) BENDABLE DISPLAY APPARATUS, SUPPORTING DEVICE, AND DUAL-SHAFT HINGE MODULE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 104 days.

(21) Appl. No.: 15/847,565

(22) Filed: Dec. 19, 2017

(65) Prior Publication Data
US 2019/0040904 A1 Feb. 7, 2019

(30) Foreign Application Priority Data

Aug. 7, 2017 (TW) .............................. 106126574 A

(51) Int. Cl.
*E05D 3/12* (2006.01)
*G06F 1/16* (2006.01)

(52) U.S. Cl.
CPC .............. *E05D 3/12* (2013.01); *G06F 1/1641* (2013.01); *G06F 1/1652* (2013.01); *G06F 1/1681* (2013.01); *E05D 3/122* (2013.01); *E05Y 2900/606* (2013.01); *Y10T 16/547* (2015.01)

(58) Field of Classification Search
CPC .... G06F 1/1681; G06F 1/1641; G06F 1/1652; E05D 3/12; Y10T 16/547
USPC .......................................................... 16/366
See application file for complete search history.

(56) References Cited

U.S. PATENT DOCUMENTS

| 5,493,760 | A | * | 2/1996 | Takimoto | .................. | E05D 3/12 |
| | | | | | | 16/366 |
| 5,659,929 | A | * | 8/1997 | Cheng | ....................... | E05D 3/12 |
| | | | | | | 16/366 |
| 7,159,279 | B2 | * | 1/2007 | Liu | ........................... | E05D 3/10 |
| | | | | | | 16/327 |
| 9,185,815 | B2 | * | 11/2015 | Hsu | ....................... | H05K 5/0226 |
| 9,265,166 | B2 | * | 2/2016 | Hsu | ....................... | H05K 5/0226 |
| 9,265,167 | B2 | * | 2/2016 | Hsu | ....................... | H04M 1/022 |
| 9,274,566 | B1 | * | 3/2016 | Horng | .................. | G06F 1/1681 |

(Continued)

FOREIGN PATENT DOCUMENTS

| TW | M483648 U | 8/2014 |
| TW | M537374 U | 2/2017 |

*Primary Examiner* — Jeffrey O'Brien
(74) *Attorney, Agent, or Firm* — Li & Cai Intellectual Property (USA) Office

(57) ABSTRACT

A supporting device includes a dual-shaft hinge module and two buffering modules respectively arranged at two opposite sides of the dual-shaft hinge module. Each dual-shaft hinge module includes two shafts, a linking member clamped between the two shafts, and two side wing members respectively and slidably installed on the two shafts. The two buffering modules are respectively installed on the two shafts and are respectively cooperated with the two side wing members. Each buffering module includes an internal connecting member fixed on and synchronously rotatable with the corresponding shaft and an external connecting member slidably disposed on the internal connecting member and provided to be fixed on a carrying plate. Each side wing member has a limiting portion passing through the corresponding internal connecting member and the corresponding external connecting member.

4 Claims, 15 Drawing Sheets

(56) References Cited

U.S. PATENT DOCUMENTS

| | | | |
|---|---|---|---|
| 2015/0160695 A1* | 6/2015 | Su | G06F 1/1618 16/366 |
| 2015/0245510 A1* | 8/2015 | Hsu | H05K 5/0226 16/250 |

* cited by examiner

BENDABLE DISPLAY APPARATUS, SUPPORTING DEVICE, AND DUAL-SHAFT HINGE MODULE

BACKGROUND OF THE INVENTION

1. Field of the Invention

The present disclosure relates to a display device; in particular, to a bendable display apparatus, a supporting device, and a dual-shaft hinge module.

2. Description of Related Art

When a conventional supporting device is outwardly bent, the total length of the hinge module of the conventional supporting device is not changed, and a plate mounted on an outer surface of the conventional supporting device is deformed because the hinge module stretches the plate. That is to say, when a bendable display mounted on the outer surface of the conventional supporting device is outwardly bent, the bendable display is easily broken because the hinge module of the conventional supporting device stretches the bendable display.

SUMMARY OF THE INVENTION

The present disclosure provides a bendable display apparatus, a supporting device, and a dual-shaft hinge module to effectively improve the drawbacks associated with conventional supporting devices (or conventional hinge modules).

The present disclosure discloses a bendable display apparatus, which includes a carrying plate, a bendable display, and two supporting devices. The carrying plate has an inner surface and an outer surface opposing to the inner surface. The bendable display is mounted on the outer surface of the carrying surface. The two supporting devices are disposed on the inner surface of the carrying plate and define two rotation axes. Each of the two supporting devices includes a dual-shaft hinge module and two buffering modules. The dual-shaft hinge module includes two shafts, a transmitting member, and two side wing members. The two shafts are respectively arranged in the two rotation axes and each have a spiral groove recessed on an outer surface thereof. The transmitting member is clamped between the two shafts. The transmitting member has two driving portions respectively protruding from two opposite sides thereof and is respectively inserted into the two spiral grooves of the two shafts. The two side wing members are respectively and slidably fastened to the two shafts and each have a limiting portion. One of the two shafts is spinable to synchronously rotate the other shaft through the transmitting member so as to respectively move the two side wing members along the two shafts. The two buffering modules are respectively fastened to the two shafts and are arranged at two opposite outer sides of the two shafts. The two buffering modules are respectively cooperated with the two side wing members. Each of the two buffering modules includes an internal connecting member and an external connecting member. The internal connecting member is fixed on and synchronously rotatable with the corresponding shaft. The internal connecting member has a long hole parallel to each of the two rotation axes and sleeved on the limiting portion of the corresponding side wing member. The external connecting member is fixed on the inner surface of the carrying plate and is slidably disposed on the internal connecting member. The external connecting member has a slanting hole non-parallel to each of the two rotation axes and sleeved on the limiting portion of the corresponding side wing member. The slanting hole has a first end arranged adjacent to the corresponding shaft and an opposite second end arranged away from the corresponding shaft. When the carrying plate is bent along at least one of the two axes between an unfolded position and an outwardly folded position, the external connecting member of each of the buffering modules slides with respect to the corresponding internal connecting member, and each of the limiting portions moves in the corresponding slanting hole from the first end to the second end.

The present disclosure also discloses a supporting device for being mounted on a carrying plate. The supporting device includes a dual-shaft hinge module and two buffering modules. The dual-shaft hinge module includes two shafts, a transmitting member, and two side wing members. The two shafts are substantially parallel to each other and each have a spiral groove recessed on an outer surface thereof. The transmitting member is clamped between the two shafts. The transmitting member has two driving portions respectively protruding from two opposite sides thereof and respectively inserted into the two spiral grooves of the two shafts. The two side wing members are respectively and slidably fastened to the two shafts and each have a limiting portion. One of the two shafts is spinable to synchronously rotate the other shaft through the transmitting member so as to respectively move the two side wing members along the two shafts. The two buffering modules are respectively fastened to the two shafts and are arranged at two opposite outer sides of the two shafts. The two buffering modules are respectively cooperated with the two side wing members. Each of the two buffering modules includes an internal connecting member and an external connecting member. The internal connecting member is fixed on and synchronously rotatable with the corresponding shaft. The internal connecting member has a long hole parallel to each of the two shafts and sleeved on the limiting portion of the corresponding side wing member. The external connecting member is slidably disposed on the internal connecting member and is configured for being fixed on an inner surface of the carrying plate. The external connecting member has a slanting hole non-parallel to the long hole and sleeved on the limiting portion of the corresponding side wing member. The slanting hole has a first end arranged adjacent to the corresponding shaft and an opposite second end arranged away from the corresponding shaft.

The present disclosure further discloses a dual-shaft hinge module, which includes two shafts, a transmitting member, two linking members, and two side wing members. The two shafts are substantially parallel to each other and each have a spiral groove recessed on an outer surface thereof. The transmitting member is clamped between the two shafts. The transmitting member has two driving portions respectively protruding from two opposite sides thereof and respectively inserted into the two spiral grooves. The two linking members are respectively arranged at two opposite sides of the transmitting block. Each of the two linking members is sleeved on the two shafts, and two opposite ends of the transmitting rod are respectively abutted against inner surfaces of the two linking members. The two side wing members are respectively and slidably fastened to the two shafts. Each of the two side wing members includes two end portions slidably sleeved on the corresponding shaft and respectively abutted against outer surfaces of the two linking members, and each of the two side wing members has a limiting portion. When one of the two shafts is spun to synchronously rotate the other shaft through the transmitting member, the transmitting member and the two linking members are synchronously moved to move the two side wing members along the two shafts at the same time.

In summary, when the two shafts of each supporting device are spun (i.e., the carrying plate is bent), the hinge module and the connected two buffering modules of each supporting device are cooperated to relatively move each external connecting member and the corresponding internal connecting member in a predetermined distance, thereby preventing the bendable display from suffering damage.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 15, which illustrate an embodiment of the present disclosure. References are hereunder made to the detailed descriptions and appended drawings in connection with the present disclosure. However, the appended drawings are merely provided for exemplary purposes, and should not be construed as restricting the scope of the present disclosure.

Figure 1:
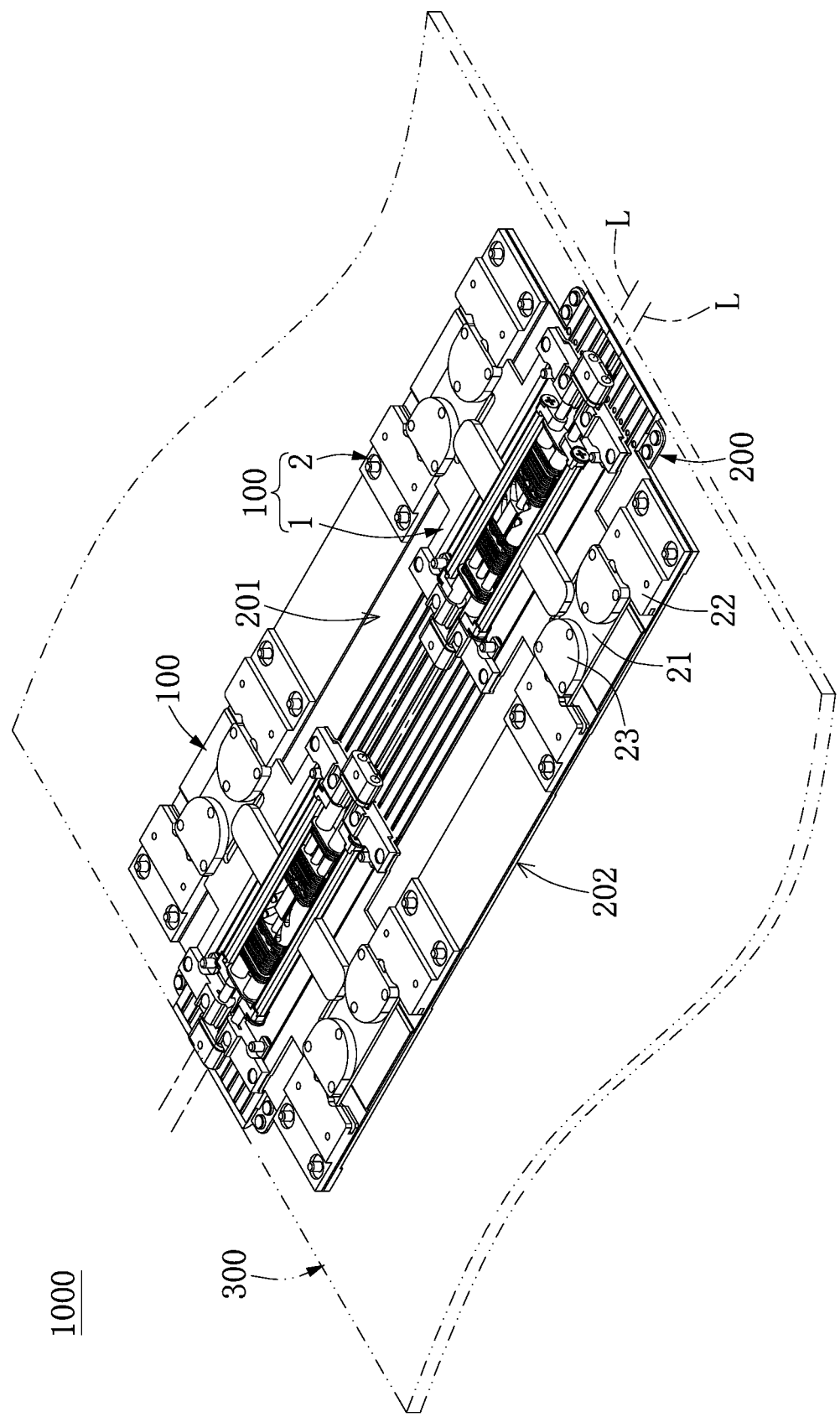
FIG. 1 is a perspective view showing a bendable display apparatus at an unfolded position according to an embodiment of the present disclosure.
Figure 2:
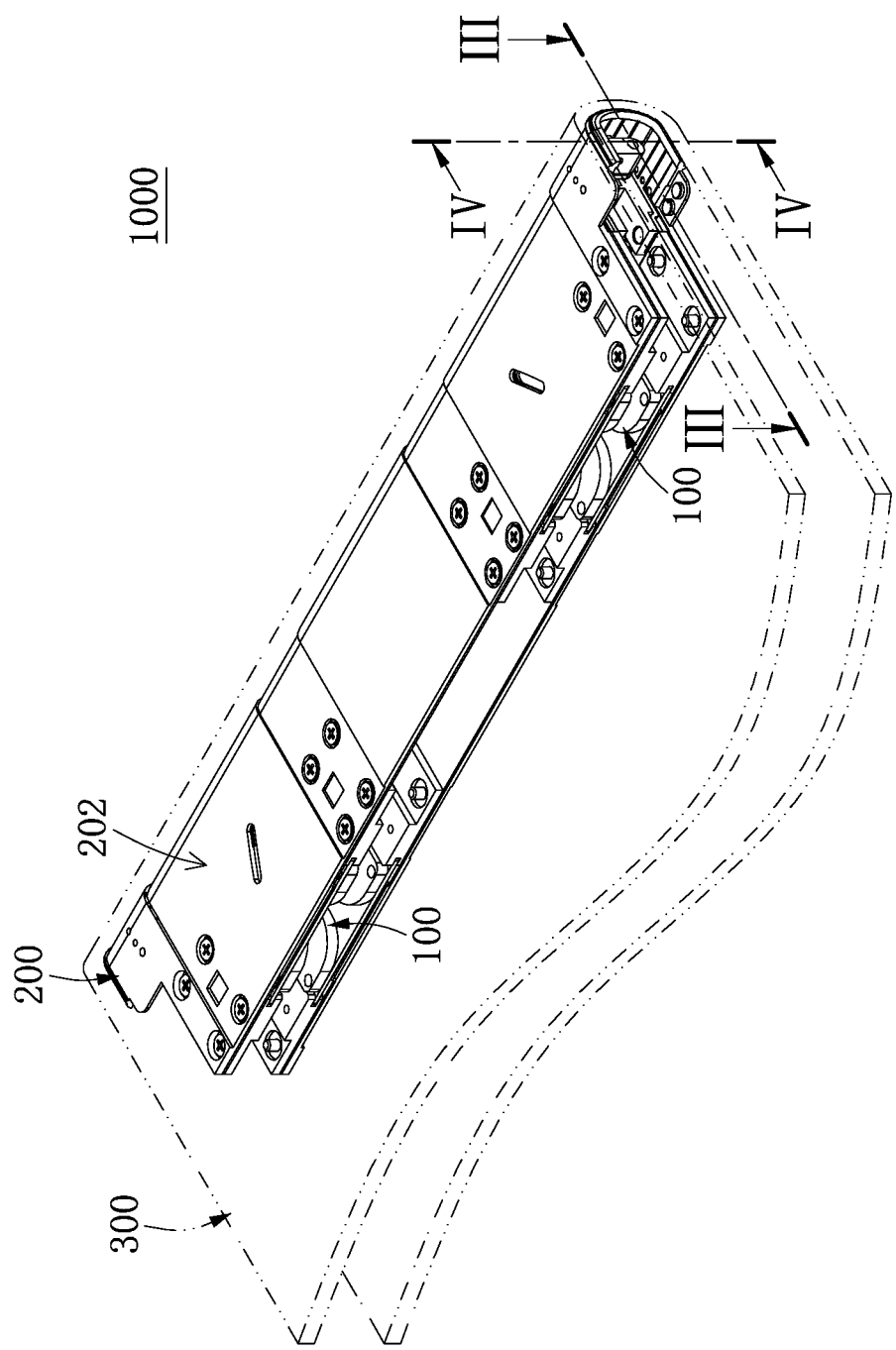
FIG. 2 is a perspective view showing the bendable display apparatus at an outwardly folded position according to the embodiment of the present disclosure.

Reference is first made to FIGS. 1 to 7, which illustrate a bendable display apparatus 1000 of the present embodiment. The bendable display apparatus 1000 includes a carrying plate 200, two supporting devices 100 mounted on an inner surface 201 of the carrying plate 200, and a bendable display 300 mounted on an outer surface 202 of the carrying plate 200. The two supporting devices 100 co-define two parallel rotation axes L. The carrying plate 200 in the present embodiment includes a rubber sheet and at least one metallic sheet embedded in the rubber sheet, but the present disclosure is not limited thereto. Moreover, in the present embodiment, a portion (i.e., a center portion) of the bendable display 300 corresponding in position to the two supporting devices can be outwardly bent at 180 degrees (as shown in FIG. 2) without suffering damage, but the present disclosure is not limited thereto.

It should be noted that the movement of the bendable display apparatus 1000 is a relative motion, but the figures are of a fixed part of the components for clearly showing the present embodiment. Moreover, each of the two supporting devices 100 in the present embodiment is applied to the bendable display apparatus 1000, but the supporting device 100 can be applied to other apparatus.

The bendable display apparatus 1000 can be bent between an unfolded position (as shown in FIG. 1) and an outwardly folded position (as shown in FIG. 2). The following description discloses the structure of each of the components of the bendable display apparatus 1000, and then discloses the related features of the components of the bendable display apparatus 1000. The two supporting devices 100 in the present embodiment are substantially an identical or a symmetrical structure, so the following description only illustrates one of the two supporting devices 100.

Figure 8:
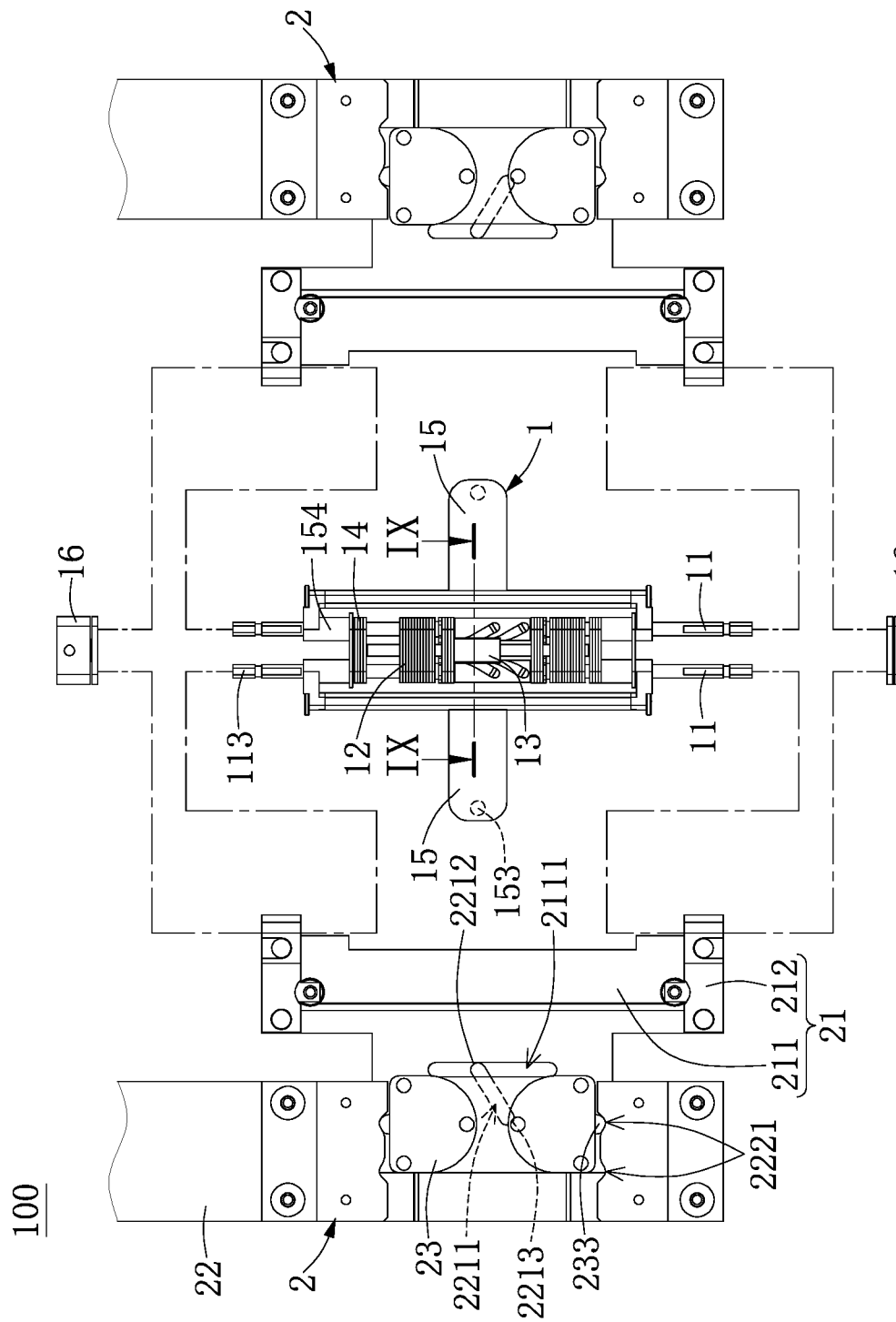
FIG. 8 is an exploded view showing a supporting device according to the embodiment of the present disclosure.
Figure 9:
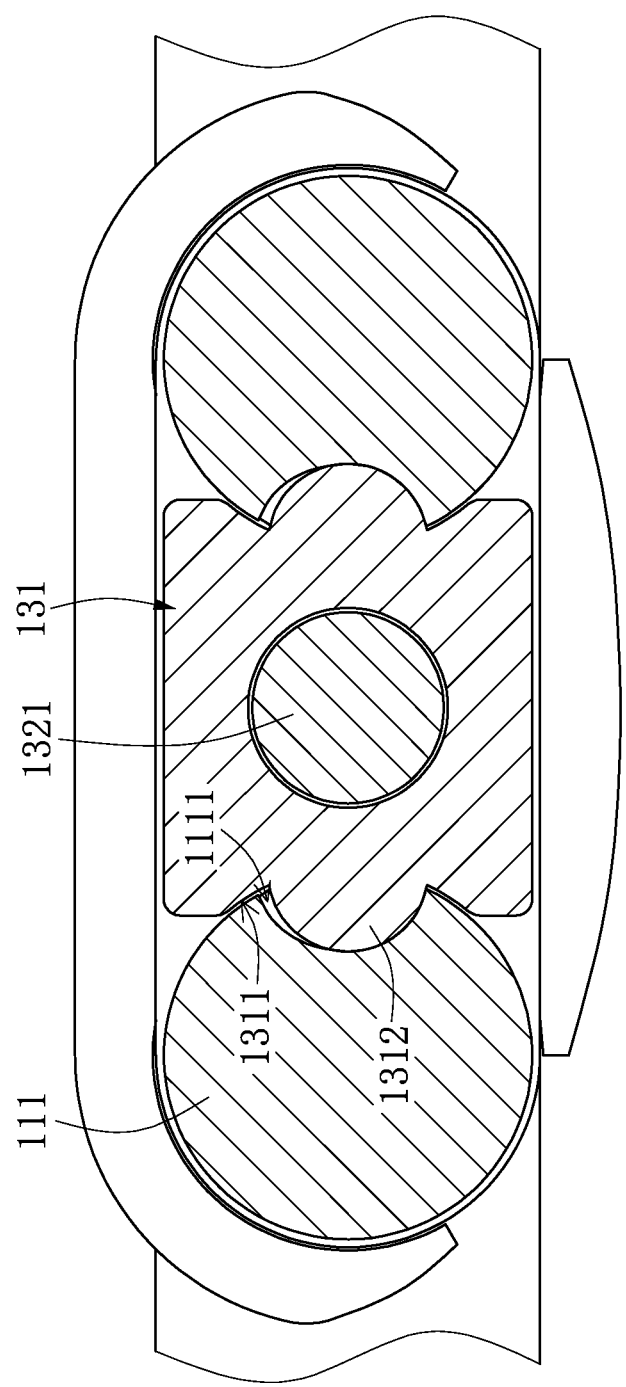
FIG. 9 is a cross-sectional view taken along a cross-sectional line IX-IX of FIG. 8.

As shown in FIGS. 8 and 9, the supporting device 100 includes a dual-shaft hinge module 1 and two buffering modules 2 respectively arranged at two opposite sides of the dual-shaft hinge module 1. The dual-shaft hinge module 1 in the present embodiment is applied to the supporting device 100, but the dual-shaft hinge module 1 can be applied to other devices.

The dual-shaft hinge module 1 includes two shafts 11, a plurality of torsion washers 12, a transmitting member 13, two linking members 14, two side wing members 15, and two positioning members 16. The two shafts 11 are respectively arranged in the two rotation axes L. Each of the torsion washers 12 is sleeved on the two shafts 11. A portion of the transmitting member 13 is sandwiched between the two shafts 11. Each of the two linking members 14 is sleeved on the two shafts 11, and the two linking members 14 are arranged at two opposite sides of the transmitting member 13. The two side wing members 15 are respectively and slidably disposed on the two shafts 11. The following description discloses the structure and connection of each component of the dual-shaft hinge module 1.

Figure 10:
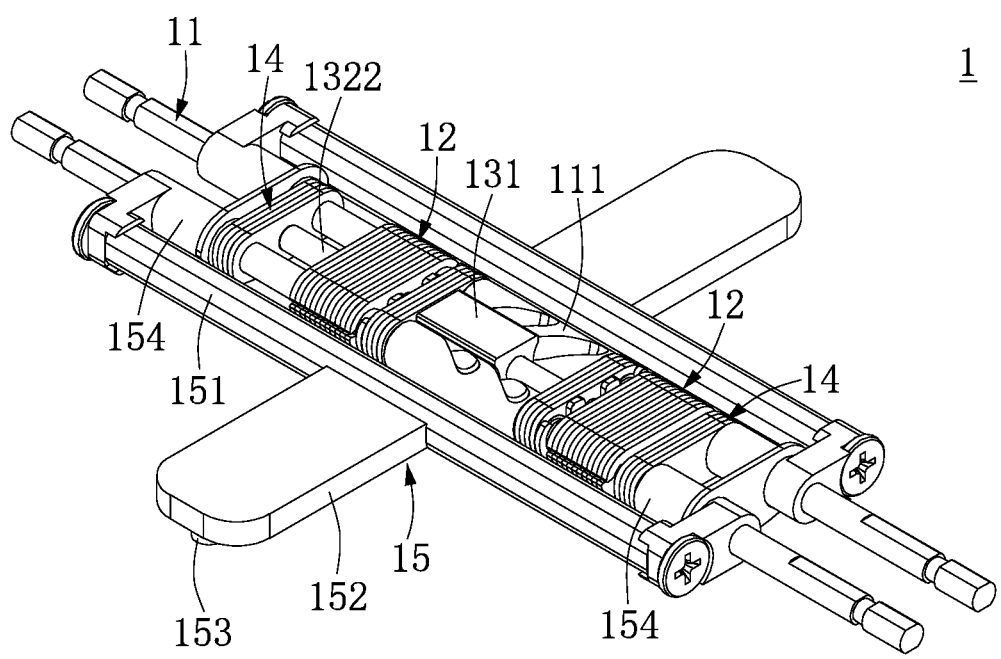
FIG. 10 is a perspective view showing a dual-shaft hinge module of FIG. 8 in which two positioning members are omitted.
Figure 11:
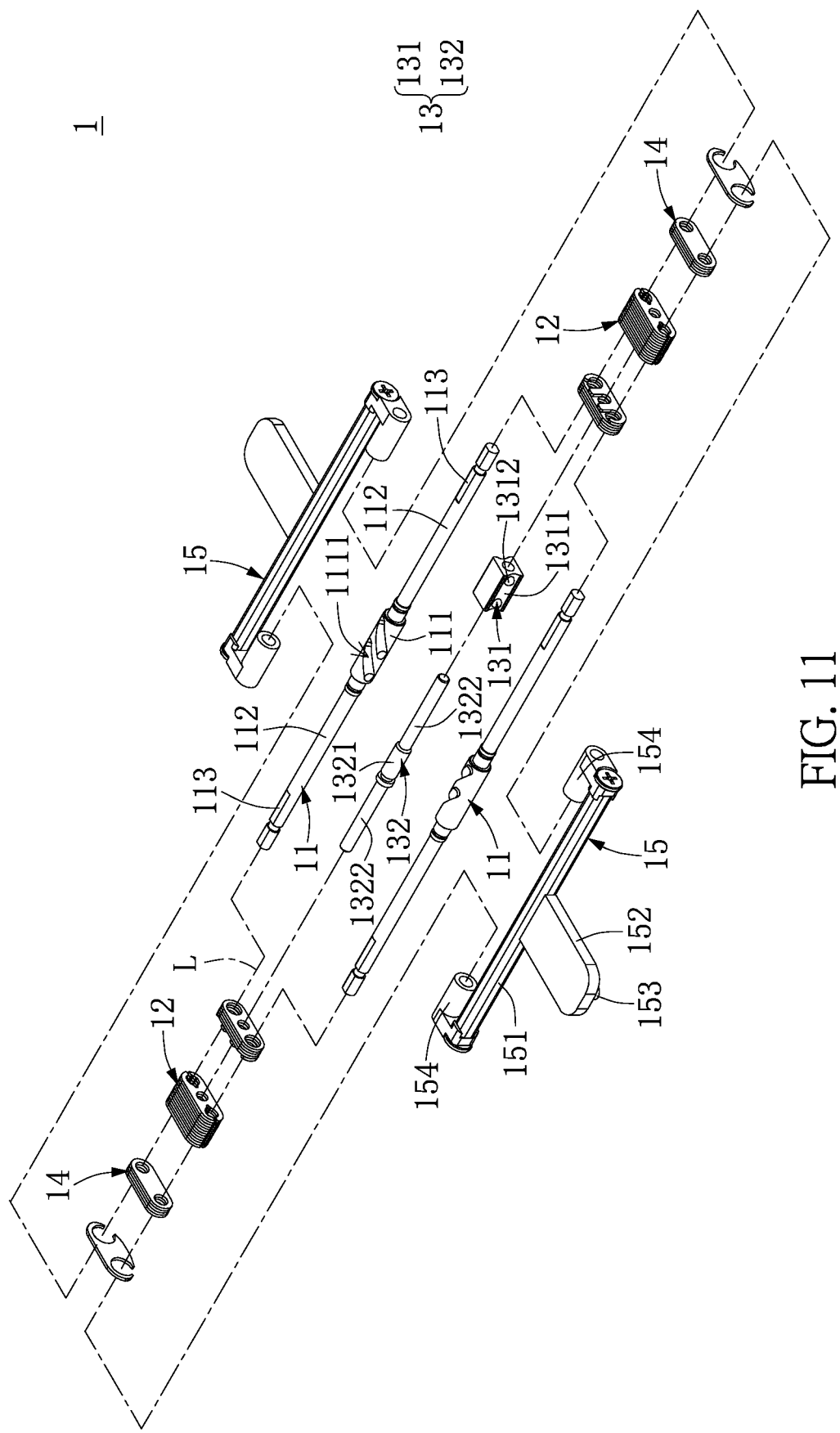
FIG. 11 is an exploded view of FIG. 10.
Figure 12:
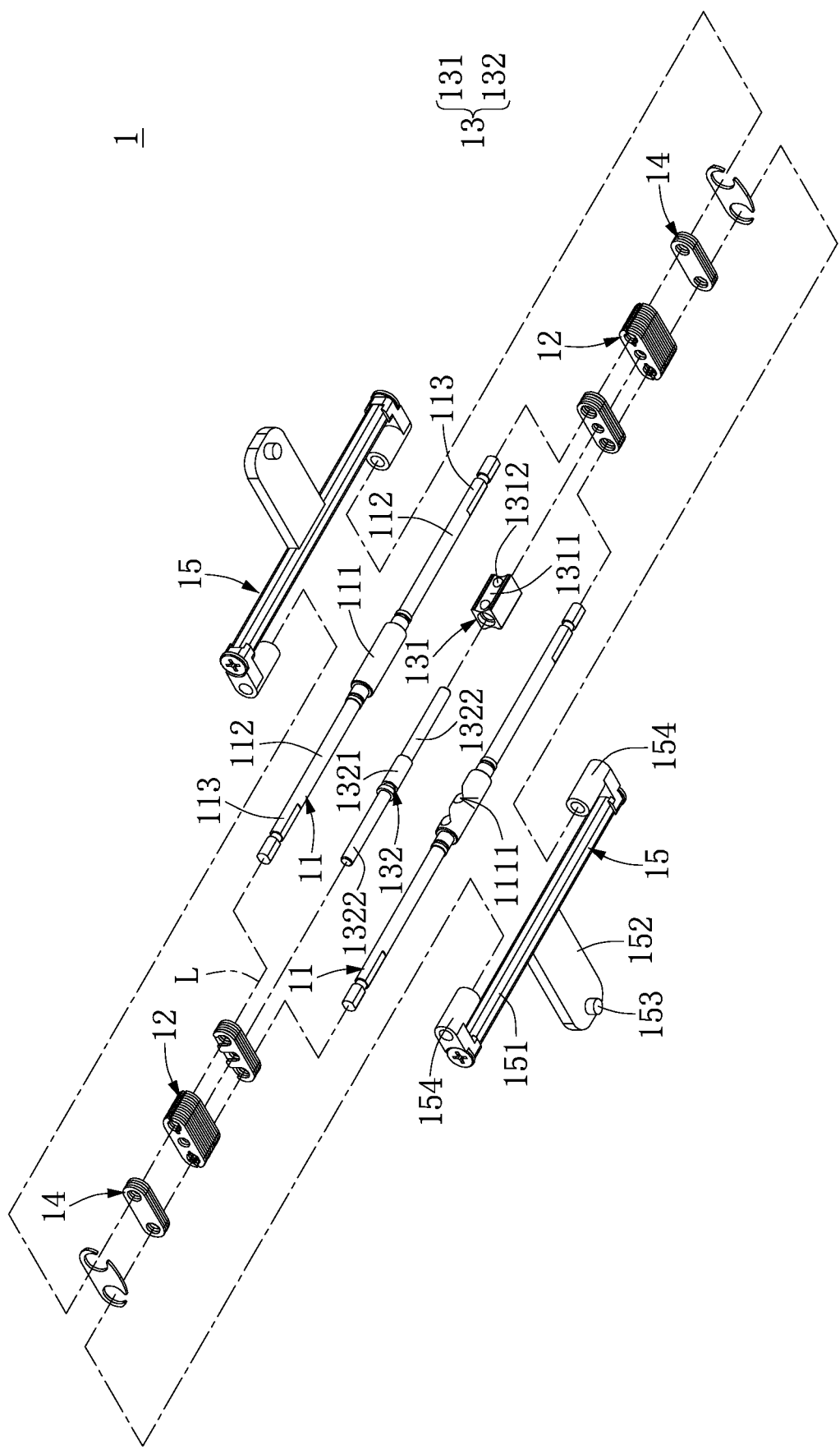
FIG. 12 is an exploded view of FIG. 10 from another perspective.
Figure 13:
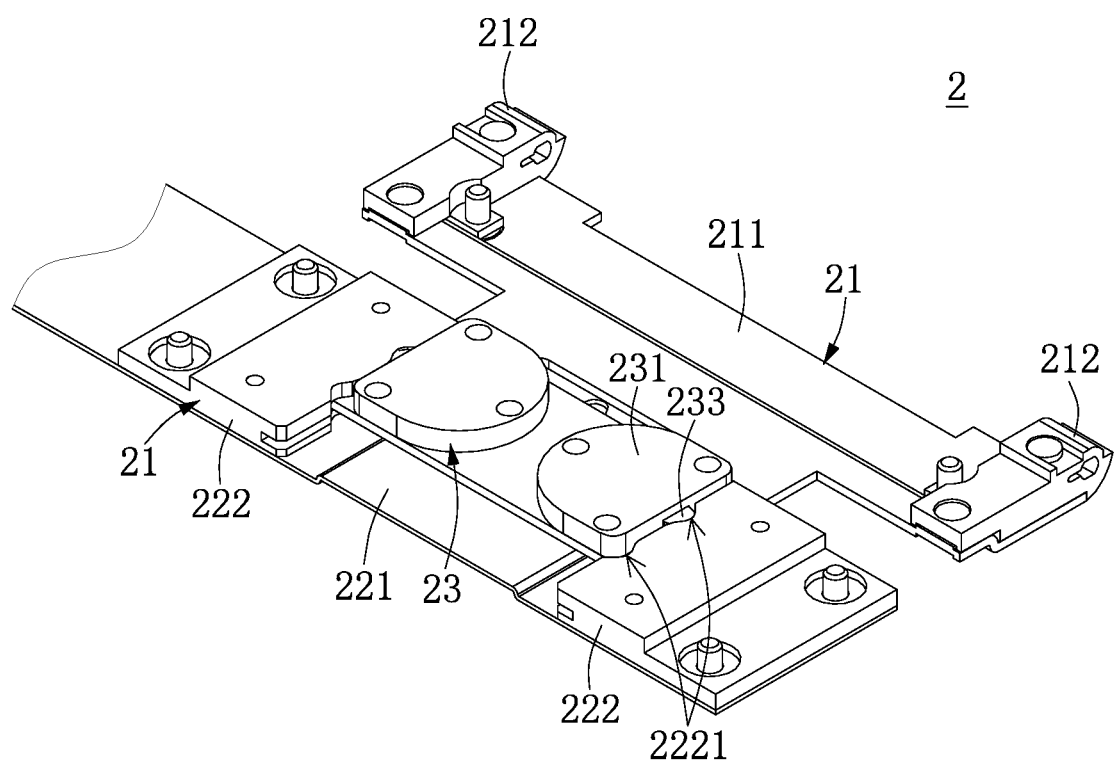
FIG. 13 is a perspective view showing a buffering module of FIG. 8.
Figure 14:
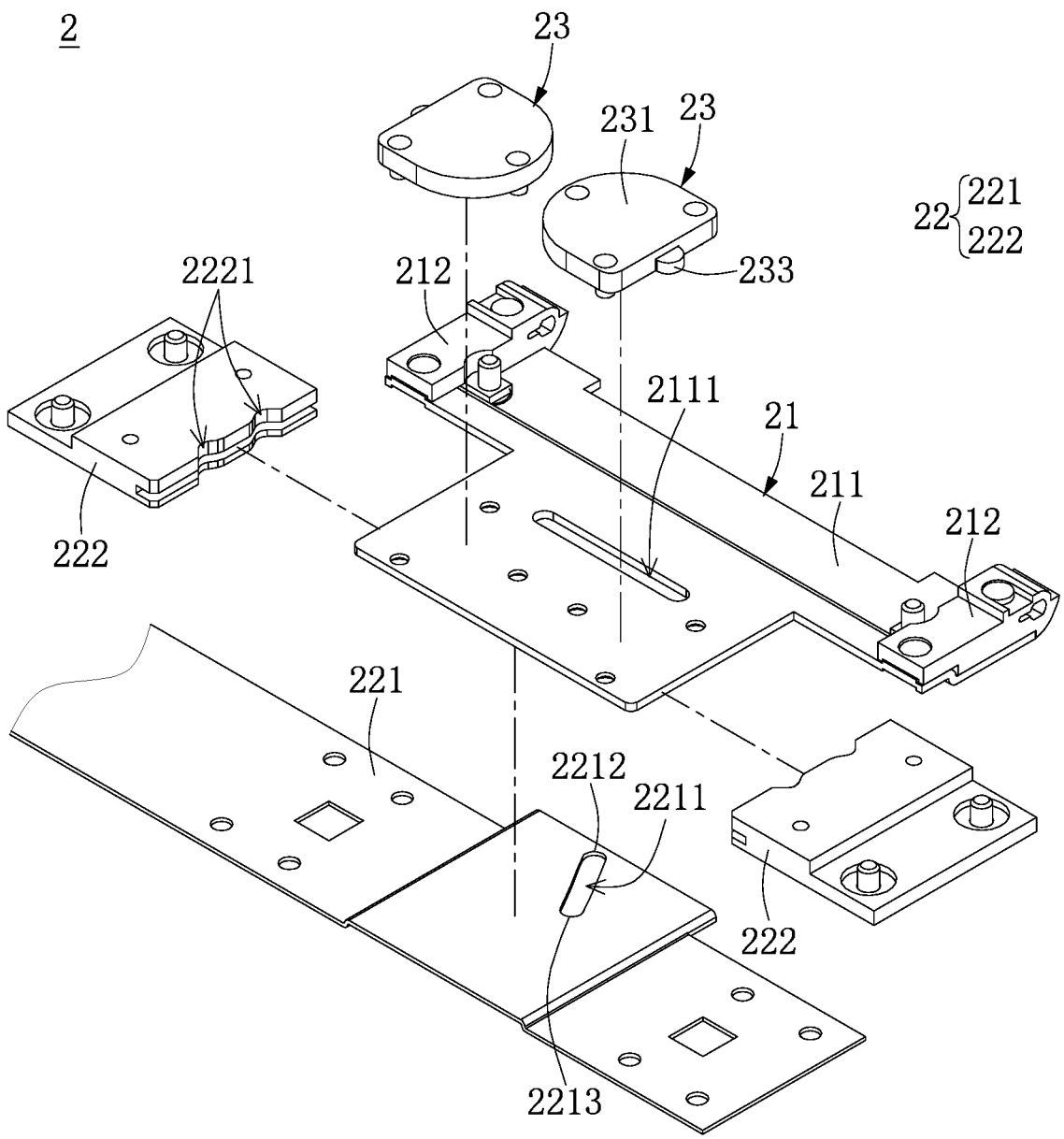
FIG. 14 is an exploded view of FIG. 13.

As shown in FIGS. 10 to 12, the two shafts 11 are substantially parallel to each other, that is to say, central lines of the two shafts 11 are respectively overlapped on the two rotation axes L. The two shafts 11 in the present embodiment are in a mirror symmetrical arrangement, so the following description only discloses the structure of one of the two shafts 11 for the sake of brevity.

The shaft 11 includes a driving segment 111, two extending segments 112 respectively arranged at two opposite outer sides of the driving segment 111 (i.e., the left side and the right side of the driving segment 111 as shown in FIG. 11), and two wedging segments 113 respectively arranged at two opposite outer sides of the two extending segments 112 (i.e., the left side and the right side of the two extending segments 112 as shown in FIG. 11). A cross section of the driving segment 111 perpendicular to the central line of the shaft 11 has a substantial circular shape, and a maximum diameter of the driving segment 111 is equal to that of the shaft 11. A cross section of each of the two extending segments 112 perpendicular to the central line of the shaft 11 has a non-circular shape. A cross section of each of the two wedging segments 113 perpendicular to the central line of the shaft 11 can be a circular shape or a non-circular shape according to a designer's demand.

Specifically, the shaft 11 has two spiral grooves 1111 recessed on an outer surface of the driving segment 111, and each of the spiral grooves 1111 has a spiral angle within a range of 40~60 degrees. The spiral angle in the present embodiment is 45 degrees, but the present disclosure is not limited thereto. A depth of each of the spiral grooves 1111 is substantially 1/5~1/7 of the maximum diameter of the driving segment 111, and the depth of each of the spiral grooves 1111 in the present embodiment is substantially 1/6 of the maximum diameter of the driving segment 111. Moreover, a projecting region, which is defined by orthogonally projecting each of the spiral grooves 1111 in a longitudinal direction of the shaft 11 (i.e., the rotation axis L) onto a plane, is an arc shape having a central angle equal to or smaller than 90 degrees, and the central angle in the present embodiment is 90 degrees, but the present disclosure is not limited thereto.

Each of the extending segments 112 in the present embodiment is substantially a round column, and the outer diameter is smaller than the maximum diameter of the driving segment 111. Moreover, each of the wedging segments 113 is a column having the non-circular cross section, so that the two wedging segments 113 can be respectively fixed to the two buffering modules 2.

For the two shafts 11, the two extending segments 112 of each of the two shafts 11 respectively couple through the torsion washers 12. That is to say, the torsion washers 12 of the dual-shaft hinge module 1 are respectively arranged at two opposite sides of the two driving segments 111 (i.e., the left side and the right side of the two driving segments 111 as shown in FIG. 10). Thus, the two shafts 11 are spinable with respect to each of the torsion washers 12 to provide torsion for the dual-shaft hinge module 1 by a friction generated between the extending segments 112 of the two shafts 11 and each of the torsion washers 12. Moreover, the arrangement of the torsion washers 12 can be provided to effectively maintain the relative position between the two shafts 11.

Figure 6:
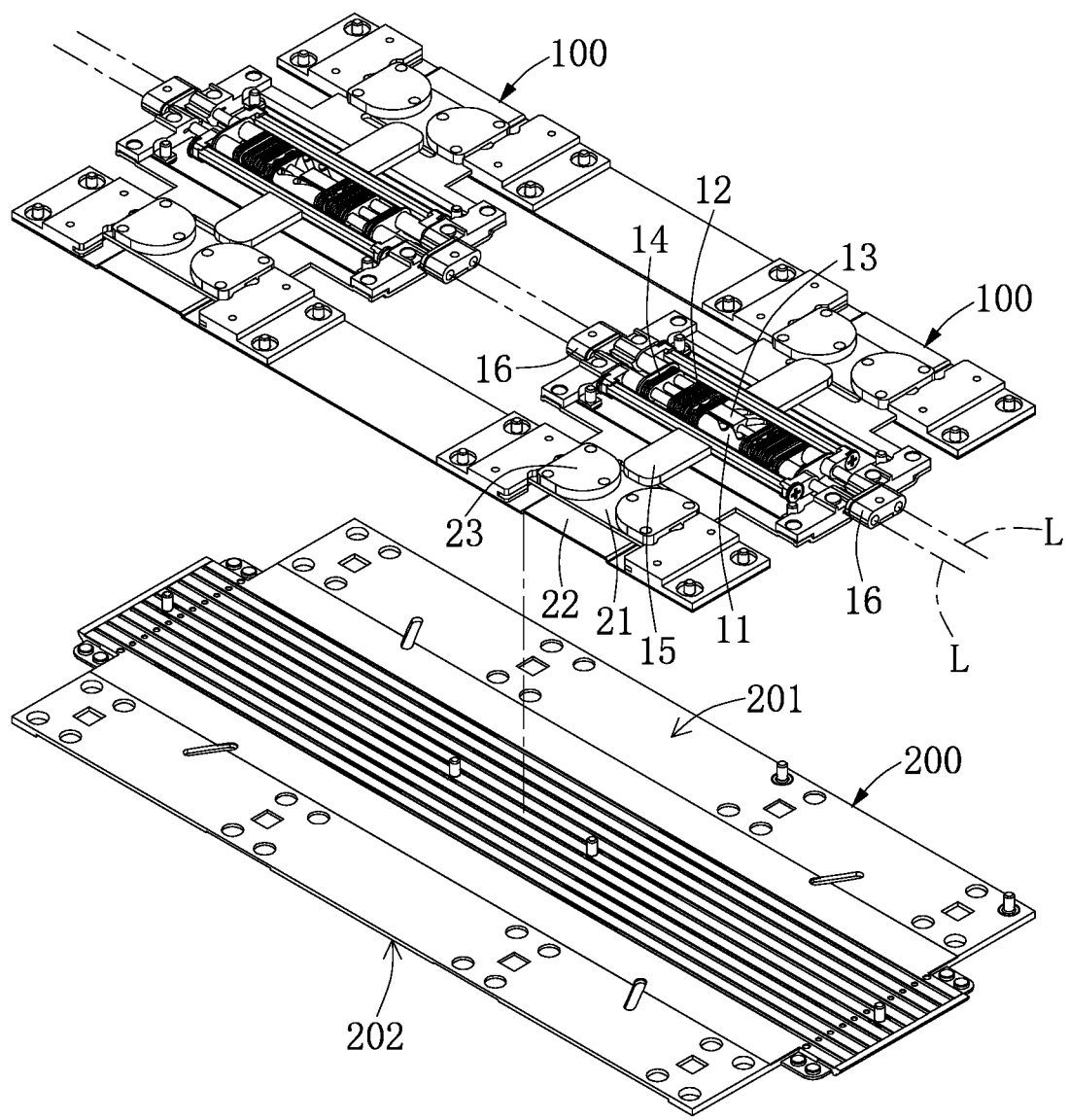
FIG. 6 is an exploded view of FIG. 1.
Figure 7:
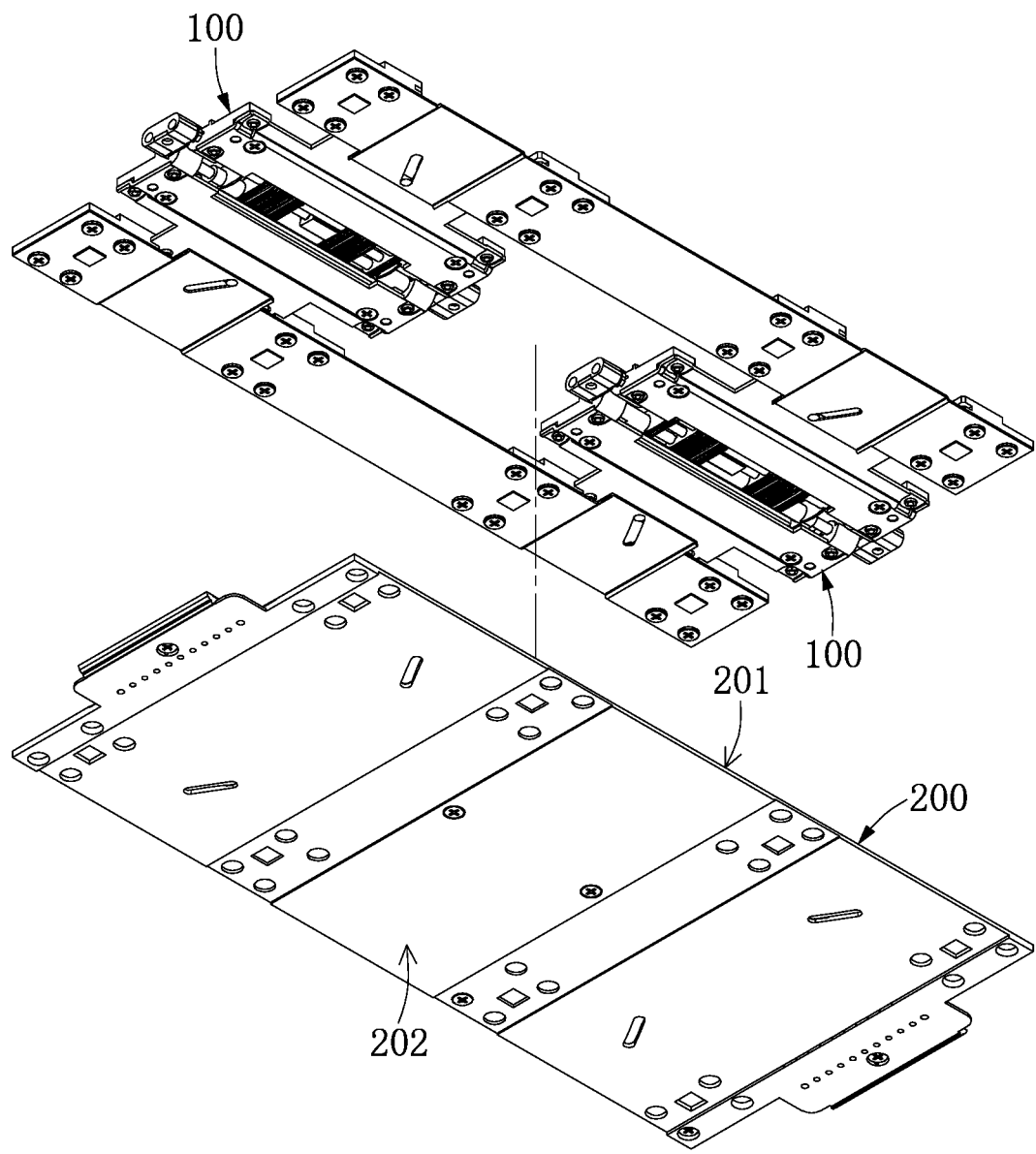
FIG. 7 is an exploded view of FIG. 1 from another perspective.

Moreover, in the two shafts 11 as shown in FIG. 8, any two adjacent wedging segments 113 are inserted into one of the positioning members 16. That is to say, the two wedging segments 113 of each of the two shafts 11 are respectively inserted into and fixed in the two positioning members 16. A center portion of each of the two positioning members 16 is fixed on the inner surface 201 of the carrying plate 200 (as shown in FIG. 6).

As shown in FIGS. 10 to 12, the transmitting member 13 includes a transmitting block 131 and a transmitting rod 132 connected to (i.e., coupling through and fastened to) the transmitting block 131. The transmitting block 131 and the transmitting rod 132 can be integrally connected to each other or detachably connected to each other, but the present disclosure is not limited thereto.

The transmitting block 131 has two concave surfaces 1311 respectively recessed on two opposite sides thereof (i.e., the front side and the rear side of the transmitting block 131 as shown in FIG. 11) and four driving portions 1312 respectively protruding from the two concave surfaces 1311. The four driving portions 1312 of the transmitting block 131 in the present embodiment are in a mirror symmetrical arrangement, but the present disclosure is not limited thereto.

Specifically, the transmitting block 131 is sandwiched between the two shafts 11, and the two concave surfaces 1311 of the transmitting block 131 respectively face the driving segments 111 of the two shafts 11. Each of the two concave surfaces 1311 is arranged to accommodate a portion of the corresponding shaft 11. The two driving portions 1312, which are corresponding in position to the same concave surface 1311, are respectively inserted into the two spiral grooves 1111 of the corresponding shaft 11.

Moreover, in order to firmly connect the two shafts 11 and the transmitting block 131, the connection between the two shafts 11 and the transmitting block 131 in the present embodiment can be provided with the following features.

Specifically, in a cross section of the dual-shaft hinge module 1 perpendicular to each of the two axes L (i.e., a cross section of the two shafts 11 and the blocking segment 131 as shown in FIG. 9), each of the driving segments 111 is substantially a circular shape, and each of the two concave surfaces 1311 is substantially an arc shape having a center of circle overlapped at a center of the portion of the driving segment 111 of the corresponding shaft 11. Moreover, in the cross section of the dual-shaft hinge module 1, a radius of each of the two concave surfaces 1311 is substantially equal to (i.e., slightly larger than) that of each driving segment 111, and each of the two concave surfaces 1311 has a central angle within a range of 80~110 degrees (i.e., 90 degrees), but the present disclosure is not limited thereto.

In addition, the number of the spiral grooves 1111 of each of the two shafts 11 in the present embodiment is two, and each of the concave surfaces 1311 is formed with two driving portions 1312, but the present disclosure is not limited thereto. For example, in other embodiments of the present disclosure, each of the two shafts 11 can be formed with a single spiral groove 1111, and the transmitting block 131 has two driving portions 1312 respectively arranged in the two concave surfaces 1311 for respectively inserting into the spiral grooves 1111 of the two shafts 11.

As shown in FIGS. 10 to 12, the longitudinal direction of the transmitting rod 132 is substantially parallel to each of the two rotation axes L. The transmitting rod 132 in the present embodiment includes a fixing segment 1321 and two connecting segments 1322 respectively extending from two opposite ends of the fixing segment 1321. The fixing segment 1321 is wedged in the transmitting block 131. The two connecting segments 1322 respectively pass through the torsion washers 12, and each of the two connecting segments 1322 and the corresponding torsion washers 12 are preferably in a frictionless connection or a low friction connection, so that the two connecting segments 1322 can slide with respect to the torsion washers 12 more smooth.

As shown in FIGS. 10 to 12, the two linking members 14 in the present embodiment are respectively arranged at two opposite sides of the transmitting block 131, and each of the linking members 14 is sleeved on the two shafts 11. Two opposite ends of the transmitting rod 132 (as shown in FIG. 11) are respectively abutted against inner surfaces of the two linking members 14. Each of the two shafts 11 and the corresponding linking members 14 are preferably in a frictionless connection or a low friction connection, so that each of the linking members 14 can slide with respect to the two shafts 11 more smooth. It should be noted that each of the linking members 14 in the present embodiment includes a plurality of stacked washers, but the present disclosure is not limited thereto. For example, in other embodiments of the present disclosure, the linking member 14 can be a single structure.

As shown in FIGS. 10 to 12, the two side wing members 15 are respectively and slidably fastened to the two shafts 11. In the present embodiment, each of the two side wing members 15 includes a long rod 151, a wing 152 perpendicularly connected to the long rod 151, a limiting portion 153 formed on an end of the wing 152, and two end portions 154 respectively installed on two opposite ends of the long rod 151.

The long rod 151 of each of the two side wing members 15 is parallel to each of the two rotation axes L, and the long rod 151 and the wing 152 of each of the two side wing members 15 in the present embodiment are integrally formed as a T-shaped structure. Each of the positioning portions 153 is integrally formed on the corresponding wing 152 and faces the inner surface 201 of the carrying plate 200. The two end portions 154 of each of the side wing members 15 are slidably sleeved on the corresponding shaft 11 and are respectively abutted against outer surfaces of the two linking members 14. Each of the two shafts 11 and the corresponding end portions 154 are preferably in a frictionless connection or a low friction connection, so that each of the end portions 154 can slide with respect to the corresponding shaft 11 more smooth.

Accordingly, the transmitting member 13 and the two linking members 14 are synchronously movable to move the two side wing members 15 along the two shafts 11 at the same time. In the addition, transmitting member 13, the two linking members 14, and the two side wing members 15 are rotatable along at least one of the two rotation axes L with respect to the two shafts 11 and the torsion washers 12.

In addition, the two linking members 14 and the transmitting member 13 in the present embodiment are different components, but the present disclosure is not limited thereto. For example, in other embodiments of the present disclosure, the two linking members 14 can be regarded as a part of the transmitting member 13 and are respectively connected to the two connecting segments 1322, or the two linking members 14 can be regarded as part of the two side wing members 15 and are respectively connected to the end portions 154 of the two side wing members 15. Thus, one of the two shafts 11 is spinable to synchronously rotate the other shaft 11 through the transmitting member 13 so as to respectively move the two side wing members 15 along the two shafts 11.

As shown in FIGS. 8 and 13-15, the two buffering modules 2 are respectively fastened to and arranged at two opposite outer sides of the two shafts 11. The two buffering modules 2 are respectively cooperated with the two side wing members 15. Each portion of each of the two buffering module 2 fastened to the corresponding shaft 11 is arranged between the positioning member 16 and the adjacent end portion 154 of the side wing member 15, and is an end of the moving path of the two side wing members 15. Moreover, as the buffering modules 2 are of the same or symmetrical structure, the following description only discloses the structure of one of the buffering modules 2 for the sake of brevity.

The buffering module 2 includes an internal connecting member 21, an external connecting member 22, and two limiting mechanisms 23. The internal connecting member 21 is fixed on and synchronously rotatable with the corresponding shaft 11. The external connecting member 22 is fixed on the inner surface 201 of the carrying plate 200 and is slidably disposed on the internal connecting member 21. The two limiting mechanisms 23 are installed on the internal connecting member 21 for positioning the external connecting member 21.

The internal connecting member 21 in the present embodiment includes a sheet 211 and two pivoting blocks 212 fixed on the sheet 211. The two pivoting blocks 212 are respectively sleeved on and fixed in the two wedging segments 113 of the corresponding shaft 11, and each of the two pivoting blocks 212 is arranged between the adjacent positioning member 16 and the adjacent end portion 154 of the corresponding side wing member 15. The sheet 211 has a long hole 2111 parallel to each of the two rotation axes L and sleeved on the limiting portion 153 of the corresponding side wing member 15. A length of the long hole 2111 is larger than the moving path of the corresponding side wing member 15 in the rotation axis L.

Moreover, the external connecting member 22 in the present embodiment includes a bottom plate 221 and two track seats 222 disposed on the bottom plate 221. The bottom plate 221 and the track seats 222 are fixed on the inner surface 201 of the carrying plate 200. The bottom plate 221 has a slanting hole 2211 non-parallel to the long hole 2111 and sleeved on the limiting portion 153 of the corresponding side wing member 15. In other words, a projecting region, which is defined by orthogonally projecting the slanting hole 2211 and the long hole 2111 onto a plane, has an acute angle there-between. The slanting hole 2211 has a first end 2212 arranged adjacent to the corresponding shaft 11 and an opposite second end 2213 arranged away from the corresponding shaft 11. Specifically, the limiting portion 153 of the corresponding side wing member 15 is sequentially inserted into the long hole 2111 and the slanting hole 2211. The sheet 211 of the internal connecting member 21 is slidably disposed on the two track seats 222 of the external connecting member 22, and each of the track seats 222 has two limiting slots 2221 spaced each other.

Figure 15:
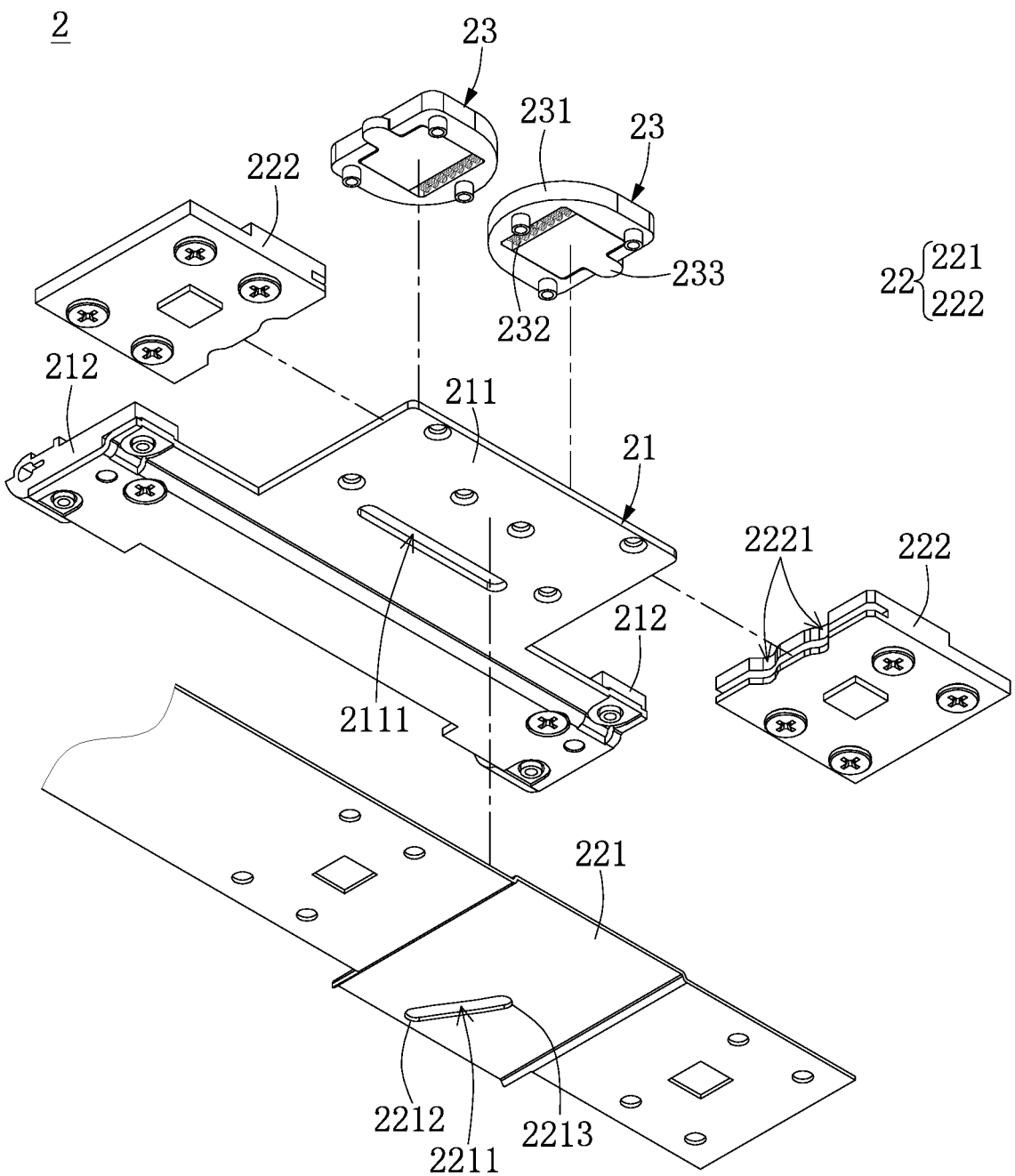
FIG. 15 is an exploded view of FIG. 13 from another perspective.

Each of the limiting mechanisms 23 in the present embodiment includes a base 231, a limiting member 232 disposed on the base 231, and a plurality of springs 233 connected to the base 231 and the limiting member 232 (as shown in FIG. 15). The bases 231 of the two limiting mechanisms 23 are fixed on the sheet 211 of the internal connecting member 21. The springs 233 of the two limiting mechanisms 23 are configured to respectively move the two limiting members 232 toward the two track seats 222, thereby maintaining the contact between each of the two limiting members 232 and the corresponding track seat 222. Moreover, each of the two limiting members 232 is selectively engaged in one of the two limiting slots 2221 of the corresponding track seat 222.

Figure 3:
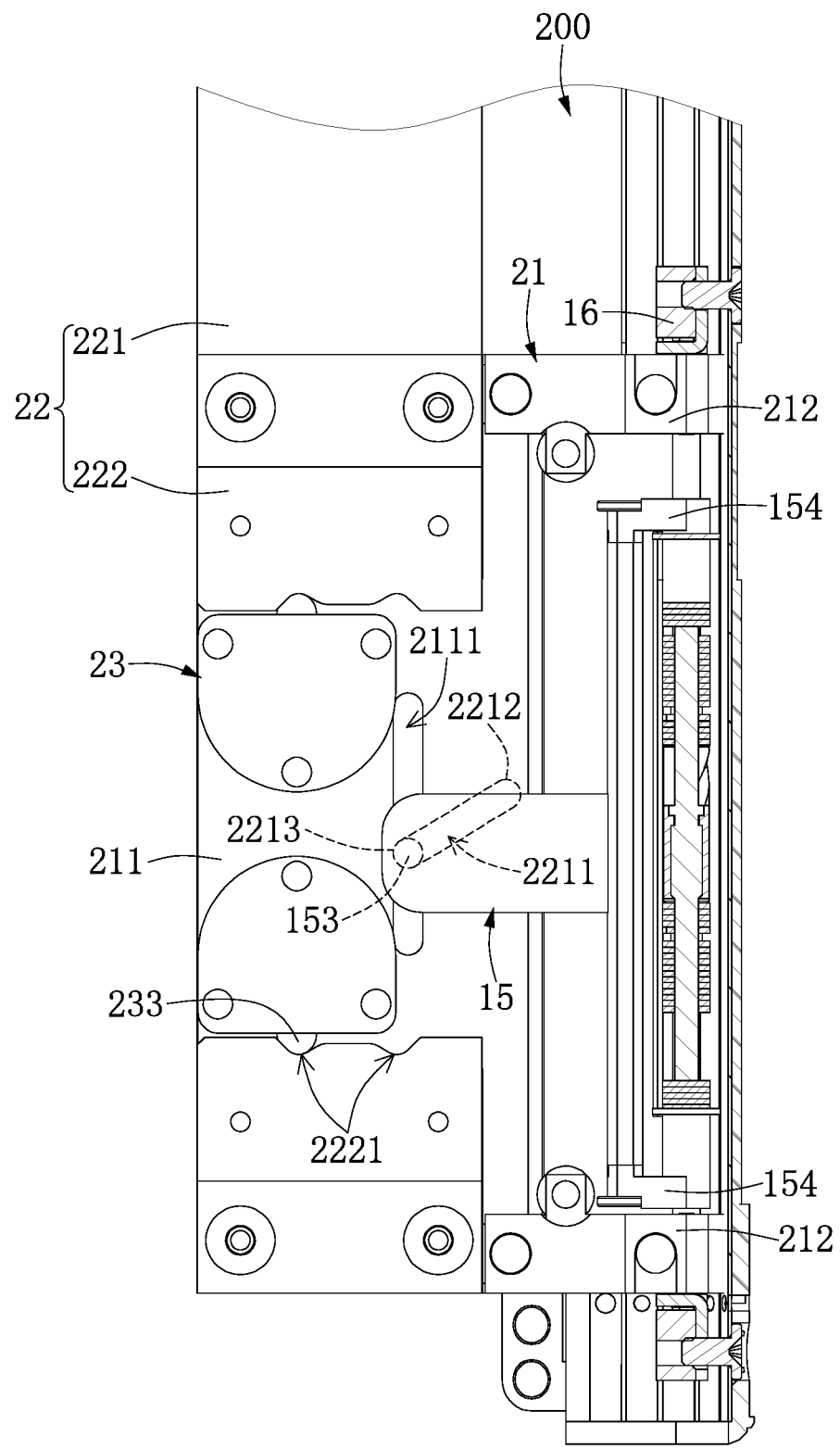
FIG. 3 is a cross-sectional view taken along a cross-sectional line of FIG. 2.
Figure 4:
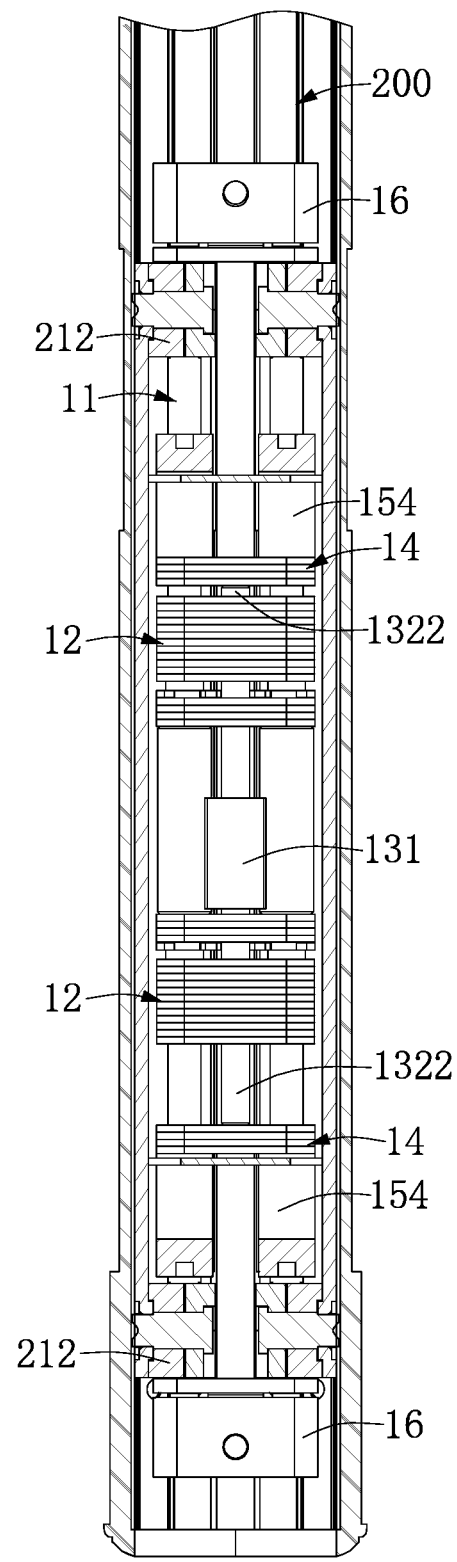
FIG. 4 is a cross-sectional view taken along a cross-sectional line IV-IV of FIG. 2.
Figure 5:
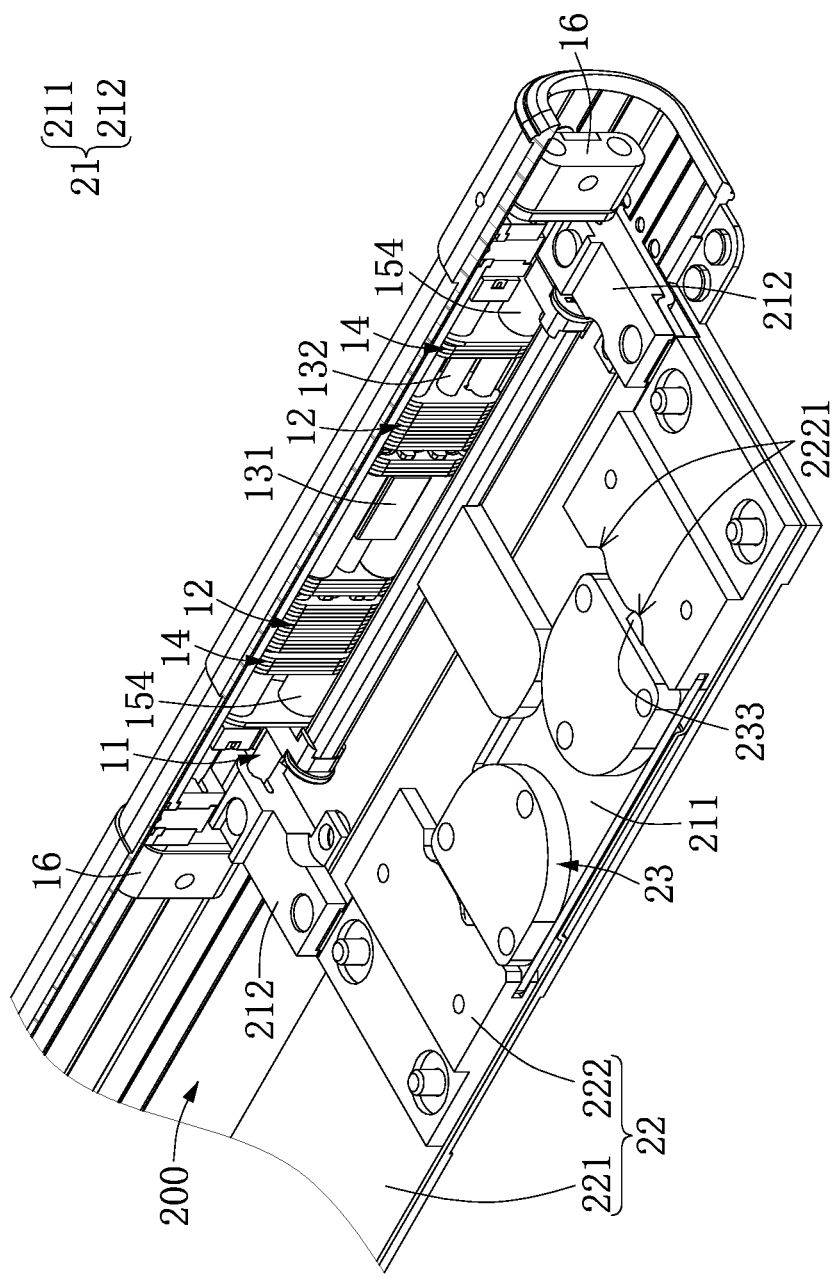
FIG. 5 is a cross-sectional perspective view of a portion of FIG. 2.

Specifically, when the carrying plate 200 is bent along at least one of the two axes L between the unfolded position (as shown in FIGS. 1 and 8) and the outwardly folded position (as shown in FIGS. 3 to 5), the external connecting member 22 of each of the buffering modules 2 slides with respect to the corresponding internal connecting member 21, each of the limiting portions 153 moves in the corresponding slanting hole 2211 from the first end 2212 to the second end 2213, and the limiting member 232 of each limiting mechanism 23 is moved from one of the two limiting slots 2221 to the other limiting slot 2221 of each track seat 222 of the corresponding external connecting member 22.

It should be noted that when the carrying plate 200 is bent, the width of the carrying plate 200 perpendicular to each of the rotation axes L and the width of each dual-shaft hinge module 2 defined by a maximum length between the two side wing members 15 are not changed, so that the two external connecting members 22 of each supporting device 100 mounted on the carrying plate 200 have a fixed length, and the two internal connecting members 21 of each dual-shaft hinge module 2 have a fixed length. Thus, when the carrying plate 200 is bent from the unfolded position toward the outwardly folded position, the two internal connecting members 21 of each supporting device 100 are outwardly moved with respect to the two corresponding external connecting members 22.

Accordingly, when the carrying plate 100 is bent to the outwardly folded position, the cooperation of each slanting hole 2211 and the corresponding limiting portion 153 and the cooperation of each limiting mechanism 23 and the two limiting slots 2221 of the corresponding external connecting member 22 are provided to effectively prevent the carrying plate 200 from being bent in a direction away from the unfolded position. In other words, the carrying plate 200 or the bendable display 300 can be avoided to be bent inwardly.

In addition, the two bottom plates 221 of one of the two supporting devices 100 in the present embodiment are respectively and integrally formed with the two bottom plates 221 of the other supporting device 100, but the present disclosure is not limited thereto. For example, in other embodiments of the present disclosure, the two bottom plates 221 of one of the two supporting devices 100 can be respectively separated from the two bottom plates 221 of the other supporting device 100.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A dual-shaft hinge module, comprising:
   two shafts substantially parallel to each other and each having a spiral groove recessed on an outer surface thereof;
   a transmitting member including a transmitting block and a transmitting rod that couples through and is fastened to the transmitting block, wherein the transmitting block is clamped between the two shafts, and the transmitting member has two driving portions respectively protruding from two opposite sides thereof and respectively inserted into the two spiral grooves; and
   two linking members respectively arranged at two opposite sides of the transmitting block, wherein each of the two linking members is sleeved on the two shafts, and two opposite ends of the transmitting rod are respectively abutted against inner surfaces of the two linking members;
   two side wing members respectively and slidably fastened to the two shafts, wherein each of the two side wing members includes two end portions slidably sleeved on the corresponding shaft and respectively abutted against outer surfaces of the two linking members, and each of the two side wing members has a limiting portion;
   wherein when one of the two shafts is spun to synchronously rotate the other shaft through the transmitting member, the two shafts drive the transmitting block and the transmitting rod to synchronously move in a path there-between, so that the transmitting rod drives the two linking members and the two side wing members to move along the two shafts at the same time.

2. The dual-shaft hinge module as claimed in claim 1, wherein the transmitting block has two concave surfaces respectively recessed on two opposite sides thereof and respectively facing the two shafts, the two driving portions respectively protrude from the two concave surfaces, and each of the two concave surfaces is arranged to accommodate a portion of the corresponding shaft.

3. The dual-shaft hinge module as claimed in claim 2, wherein in a cross section of the dual-shaft hinge module perpendicular to each of the two shafts, each of the two concave surfaces is substantially an arc shape having a center of circle overlapped at a center of the portion of the corresponding shaft.

4. The dual-shaft hinge module as claimed in claim 1, wherein each of the spiral grooves has a spiral angle within a range of 40-60 degrees, and a depth of each of the spiral grooves is $\frac{1}{5}$-$\frac{1}{7}$ of a maximum diameter of the corresponding shaft.

* * * * *